US012688706B2

(12) United States Patent
Lingenfelter et al.

(10) Patent No.: US 12,688,706 B2
(45) Date of Patent: Jul. 21, 2026

(54) SYSTEM FOR ESTIMATING CHANGES IN LANE MARKER GEOMETRY

(71) Applicant: GOOGLE LLC, Mountain View, CA (US)

(72) Inventors: Dan Lingenfelter, Mountain View, CA (US); Stephen Russell, Mountain View, CA (US)

(73) Assignee: Google LLC, Mountain View, CA (US)

( * ) Notice: Subject to any disclaimer, the term of this patent is extended or adjusted under 35 U.S.C. 154(b) by 276 days.

(21) Appl. No.: 18/382,189

(22) Filed: Oct. 20, 2023

(65) Prior Publication Data

US 2025/0131740 A1 Apr. 24, 2025

(51) Int. Cl.
*G06V 20/56* (2022.01)
*G06V 10/75* (2022.01)

(52) U.S. Cl.
CPC .......... *G06V 20/588* (2022.01); *G06V 10/751* (2022.01)

(58) Field of Classification Search
CPC ............... G06V 20/588; G06V 10/751; G01C 21/3658; G01C 21/3815; G01C 21/3841; G06F 16/29
See application file for complete search history.

(56) References Cited

U.S. PATENT DOCUMENTS

| | | | | |
|---|---|---|---|---|
| 6,338,023 | B1 * | 1/2002 | Bourgeois | ............ G01C 13/008 |
| | | | | 702/150 |
| 9,321,461 | B1 * | 4/2016 | Silver | ................... G06V 20/588 |
| 10,784,711 | B2 * | 9/2020 | Huang | ................... F24F 5/0046 |
| 11,624,518 | B2 * | 4/2023 | Locke | ...................... F25B 30/02 |
| | | | | 62/173 |
| 11,624,618 | B2 * | 4/2023 | Fasola | ................... G01S 7/4802 |
| | | | | 701/450 |
| 2018/0188045 | A1 * | 7/2018 | Wheeler | ................ G06V 10/98 |
| 2020/0166364 | A1 * | 5/2020 | Fujita | ......................... G06F 8/65 |
| 2020/0191591 | A1 * | 6/2020 | Zhang | ................. G06V 20/582 |
| 2020/0327807 | A1 * | 10/2020 | Kamrani | ............... G07C 5/085 |

(Continued)

OTHER PUBLICATIONS

Yang et al., "Conditional Adversarial Networks Based Road Marking Identification and Vectorization for High Definition Map," (2021).

(Continued)

*Primary Examiner* — Solomon G Bezuayehu
(74) *Attorney, Agent, or Firm* — Lerner David LLP

(57) ABSTRACT

To detect a change in lane marker geometry, a computing device receives map patch data from one or more vehicles within a geographic area indicative of measured lane marker positions. For each data point within the map patch data, the computing device determines an error metric based on one or more differences between one or more measured lane marker positions for the data point and one or more reference lane marker positions from a database. The computing device identifies relationships between the data points according to the error metric for each data point, a time when each data point was collected, or a location of each data point, and identifies a lane marker change event occurring within the geographic area based on the relationships between the data points. Then the computing device discards reference lane marker positions from the database corresponding to the lane marker change event.

20 Claims, 5 Drawing Sheets

100

(56) References Cited

U.S. PATENT DOCUMENTS

2021/0404813 A1 * 12/2021 Fasola ................... G01S 17/931
2022/0412772 A1    12/2022 Rabani et al.

OTHER PUBLICATIONS

Zhu et al., "On Construction and Applications of High-Definition (HD) Maps," (2021).
International Search Report and Written Opinion for Application No. PCT/US2024/051541, dated Jan. 17, 2025.

* cited by examiner

500

START

RECEIVE MAP PATCH DATA FROM VEHICLES — 502

DETERMINE ERROR METRICS FOR DATA POINTS WITHIN MAP PATCH DATA — 504

IDENTIFY RELATIONSHIPS BETWEEN THE DATA POINTS — 506

IDENTIFY LANE MARKER CHANGE EVENT BASED ON RELATIONSHIPS BETWEEN DATA POINTS — 508

DISCARD REFERENCE LANE MARKER POSITIONS CORRESPONDING TO LANE MARKER CHANGE EVENT — 510

END

SYSTEM FOR ESTIMATING CHANGES IN LANE MARKER GEOMETRY

FIELD OF THE DISCLOSURE

The present disclosure relates to estimating change in lane marker geometry and, more particularly, to real-time tracking of a lane marker change for example, due to construction by comparing sensor data indicating real-time lane marker positions with reference lane marker geometry in a map database.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, digital maps of geographic areas are commonly displayed on computing devices, such as computers, tablets, and mobile phones via mapping applications, web browsers, etc. Additionally, software applications executing in computers, smartphones, etc. or embedded devices generate step-by-step navigation directions.

Highly detailed digital maps may use lane marker geometries for lane-by-lane navigation or for presenting detailed map displays. Typically, these detailed maps are generated by receiving sensor data from vehicles with cameras to create portions of a map and stitching the portions of the map together. However, when a lane marker changes, e.g., due to a lane addition or shift, the portions of the map identified prior to the change cannot be stitched together with portions of the map identified after the change and the existing lane marker geometry becomes inaccurate.

SUMMARY

To identify the time and location where a lane marker change event occurs (also referred to herein as a "churn event"), a churn event detection system computes a root mean square error (RMSE) between sample points from the sensor data and the closest points within the reference lane marker geometry. The churn event detection system combines the RMSE with the time of the observation, and the location of the observation (using x, y coordinates) to generate a 4-dimensional feature vector. Then the churn event detection system applies a clustering algorithm to the 4-dimensional feature vectors to identify related outliers in the sensor data as points corresponding to a churn event. More generally, the churn event detection system identifies sample points that are similar in time and location and have a sufficiently large RMSE. The churn event detection system identifies a churn event at the time and location where the sample points were detected and discards the reference lane marker geometry generated in that area before the identified time.

In this manner, the present embodiments advantageously allow for accurate, detailed maps which can be used for lane-by-lane navigation, and driverless car navigation, for example. By identifying where and when a lane marker change event occurs, the churn event detection system can discard reference lane marker geometry which is no longer accurate and should not be used in mapping systems. Additionally, the churn event detection system tracks and identifies a lane marker change event in real-time so that outdated lane marker geometry is discarded right away without drivers or driverless cars having to rely on inaccurate map information. This improves the quality of detailed mapping and navigation systems.

One example embodiment of the techniques of this disclosure is a method for detecting a change in lane marker geometry. The method includes receiving map patch data from one or more vehicles within a geographic area indicative of measured lane marker positions. For each of a plurality of data points within the map patch data, the method includes determining an error metric for the data point based on one or more differences between one or more measured lane marker positions for the data point and one or more reference lane marker positions from a database. The method also includes identifying relationships between the data points according to one or more of: the error metric for each data point, a time when each data point was collected, or a location of each data point, and identifying a lane marker change event occurring within the geographic area based on the relationships between the data points. Furthermore, the method includes discarding reference lane marker positions from the database corresponding to the lane marker change event.

Another example embodiment is a computing device for detecting a change in lane marker geometry. The computing device includes one or more processors and a non-transitory computer-readable memory coupled to the one or more processors and storing instructions thereon. When executed by the one or more processors, the instructions cause the computing device to receive map patch data from one or more vehicles within a geographic area indicative of measured lane marker positions. For each of a plurality of data points within the map patch data, the instructions cause the computing device to determine an error metric for the data point based on one or more differences between one or more measured lane marker positions for the data point and one or more reference lane marker positions from a database. Additionally, the instructions cause the computing device to identify relationships between the data points according to one or more of: the error metric for each data point, a time when each data point was collected, or a location of each data point, and identify a lane marker change event occurring within the geographic area based on the relationships between the data points. Moreover, the instructions cause the computing device to discard reference lane marker positions from the database corresponding to the lane marker change event.

Yet another example embodiment is a non-transitory computer-readable memory storing instructions thereon. When executed by one or more processors, the instructions cause the one or more processors to receive map patch data from one or more vehicles within a geographic area indicative of measured lane marker positions. For each of a plurality of data points within the map patch data, the instructions cause the one or more processors to determine an error metric for the data point based on one or more differences between one or more measured lane marker positions for the data point and one or more reference lane marker positions from a database. Additionally, the instructions cause the one or more processors to identify relationships between the data points according to one or more of: the error metric for each data point, a time when each data point was collected, or a location of each data point, and identify a lane marker change event occurring within the geographic area based on the relationships between the data points. Moreover, the instructions cause the one or more processors to discard reference lane marker positions from the database corresponding to the lane marker change event.

DETAILED DESCRIPTION

Overview

Figure 1:
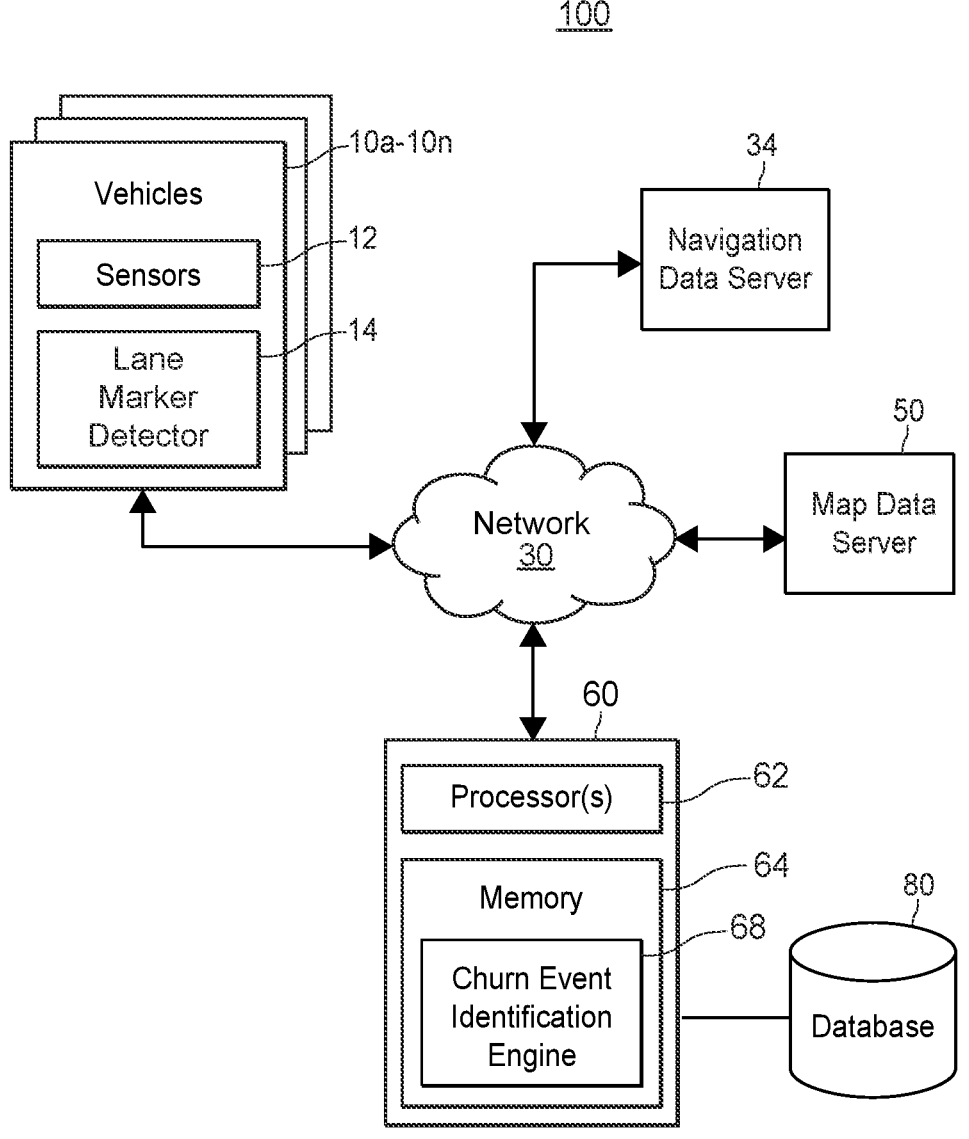
FIG. 1 is a block diagram of an example system in which techniques for detecting churn events can be implemented.

Generally speaking, the techniques of this disclosure may be implemented in one or several vehicles having sensors such as a camera, one or several network servers, or a system that includes a combination of these devices. However, for clarity, the examples below focus primarily on an embodiment in which vehicles with sensors (e.g., cameras) collect sensor data in a geographic area which indicates the positions of lane markers on a road. For example, the vehicles may capture images of the road and identify lane markers within the images using computer vision techniques. Then the vehicles may determine the locations of the lane markers based on the location of the vehicle capturing the image (e.g., using a positioning device such as GPS), the position of the lane marker within the image, and/or the scale of the image. The vehicles may also determine the time in which the images were collected. Then a vehicle head unit or other computing device in the vehicle may transmit indications of the locations of the lane markers and the times in which the sensor data was collected as map patch data to a server device.

In some implementations, the vehicle head unit or the network server identifies sample data points (also referred to herein as "data points") within the images which correspond to lane markers as map patch data and determines the locations of the sample data points and the times in which they were collected. More specifically, the vehicle unit or other computing device may generate a data point based on a map patch, where the location of the data point may be the location of the vehicle at a start location for the map patch, the center location of the map patch, or any other suitable location of the map patch. The term, map patch, as used herein, may refer to a portion of a geographic area. In some implementations, each vehicle may collect map patch data for several map patches, where each map patch is a square or rectangular region of the road. Each map patch may be the same size (e.g., 1 m$^2$).

Then the network server obtains a reference lane geometry from a database, such as a map database storing map data. The reference lane marker geometry includes the positions of lane markers on various roads. These lane marker positions may be obtained from previously collected sensor data. For a data point corresponding to a map patch, the network server identifies locations within the map patch as measured lane marker positions and compares the measured lane marker positions for the data point to the closest reference lane marker positions in the reference lane marker geometry to determine an error metric based on the differences between the measured lane marker positions and the reference lane marker positions. For example, the error metric may be a root mean square error of the pointwise differences across each of the measured lane marker positions in a given map patch. The network server may repeat this process for each data point.

The network server may then generate a four-dimensional vector for each data point including the error metric, two-dimensional location coordinates for the data point (e.g., the map patch center), and the time in which the data point was collected. Then the network server may identify relationships between the data points. For example, the network server may cluster the data points using a clustering algorithm to identify a cluster having a subset of data points collected at similar times, in similar locations, and having error metrics above a threshold error metric. The network server may then determine that the cluster corresponds to a lane marker change event (i.e., a churn event) and may discard reference lane marker geometry for reference lane marker positions corresponding to the identified cluster.

The churn event detection system protects user privacy by preventing any individual contribution to the map patch data from being identifiable. Instead, the churn event detection system does not provide the time of the churn event or an indication that there was a churn event unless enough distinct vehicles observe the churn event to make sure that no individual vehicle is identifiable.

When a client device requests map data, the discarded reference lane marker geometry is not provided to the client device and lane-by-lane navigation systems do not use the discarded reference lane marker geometry in subsequent navigation requests.

Example Hardware and Software Components

An example communication system 100 in which a churn event detection system can be implemented is illustrated in FIG. 1. The communication system 100 includes vehicles 10a-10n each having sensors 12. The sensors 12 may include a Global Positioning Service (GPS) module, a camera, a depth sensor such as a light detection and ranging (lidar) sensor, or any other suitable sensor. Each vehicle 10a-10n may also include a vehicle computing device such as a vehicle head unit having a memory and one or more processors (CPUs). The memory can be a non-transitory memory and can include one or several suitable memory modules, such as random access memory (RAM), read-only memory (ROM), flash memory, other types of persistent memory, etc.

The memory may store an operating system (OS), which can be any type of suitable mobile or general-purpose operating system. The OS 26 can include application programming interface (API) functions that allow applications to retrieve sensor readings. For example, a software application configured to execute on the computing device 10 can include instructions that invoke an OS API for retrieving a current location of the client computing device 10 at that instant. The API can also return a quantitative indication of how certain the API is of the estimate (e.g., as a percentage).

The memory also stores a lane marker detector 14, which is configured to receive sensor data from the sensors 12, such as images of the road from the camera and a location of the vehicle 10a-10n from the GPS module. Then the lane marker detector 14 analyzes the images to identify lane markers and determines the locations of the lane markers based on their positions within the images and the location of the vehicle 10a-10n. The lane marker detector 14 may also determine the time in which the images were collected.

The lane marker detector 14 may identify features in an image by detecting stable regions within the image that are detectable regardless of blur, motion, distortion, orientation, illumination, scaling, and/or other changes in camera perspective. The stable regions may be extracted from the image using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the image, such as edges within the image. A bounding box may be formed around a keypoint and the portion of the image created by the bounding box may be a feature.

In any event, the lane marker detector 14 may compare the features for various portions of the image to template features from template lane marker images using image classification and/or machine learning techniques. The machine learning techniques may include linear regression, polynomial regression, logistic regression, random forests, boosting, nearest neighbors, Bayesian networks, neural networks, support vector machines, or any other suitable machine learning technique.

In some embodiments, the template features for template lane markers may be compared to the identified features using a nearest neighbors algorithm. The nearest neighbors algorithm may identify template features which are the closest to the features of the image by creating numerical representations of the features to generate feature vectors, such as a pixel width and height of a lane marker, and RGB pixel values for the lane marker, for example. The numerical representations of the features or feature vectors of the image may be compared to the feature vectors of template features (where some correspond to template lane marker images and some do not correspond to template lane marker images) to determine a vector distance between the features of the image and a template lane marker having template features. The lane marker detector 14 may then determine whether the identified features are for a portion of the image corresponding to a lane marker based on the amount of similarity, or the vector distance in the nearest neighbors algorithm, between the identified features and the template features for template lane marker images. If the closest template features are for template lane marker images, then the portion of the image is identified as a lane marker.

When the lane marker detector 14 identifies a lane marker, the lane marker detector 14 may determine the location of the lane marker based on the location of the vehicle 10a, the orientation of the camera, the position of the lane marker within the image, and/or the scale of the image. More specifically, the lane marker detector 14 may obtain the scale of the image, the pixel width, the pixel height, and/or the orientation from the camera. The lane marker detector 14 may also determine the distance from the vehicle 10a to the lane marker using a depth sensor, for example. In other implementations, the lane marker detector 14 may approximate the distance from the vehicle 10a to the lane marker based on the height of the camera from the ground. Then the lane marker detector 14 may assign a physical location to each pixel position in the image according to the location of the vehicle 10a, the scale of the image, and/or the distance from the vehicle 10a to the lane marker.

The lane marker detector 14 may then determine the location of the lane marker according to the pixel positions of the lane marker within the image. Additionally, or alternatively, the lane marker detector 14 may obtain map patch data for map patches having the identified lane markers and may generate a data point for each map patch. The lane marker detector 14 may determine the location of the data point as the location of the vehicle at a start location for the map patch, the center location of the map patch, or any other suitable location of the map patch.

In any event, the lane marker detector 14 may then transmit indications of the locations of the lane markers (e.g., the locations of data points corresponding to lane markers) and the times in which the images were collected as map patch data to the server device 60.

The server device 60 is configured to identify churn events by comparing measured lane marker positions to reference lane marker positions stored in a database 80. For example, the database 80 may store reference lane marker geometry for lane markers that were previously identified using sensor data or in any other suitable matter. The reference lane marker geometry may include reference lane marker positions each indicating a location corresponding to a lane marker or a portion thereof.

More generally, the server device 60 can communicate with one or several databases that store any type of suitable geospatial information or information that can be linked to a geographic context. The communication system 100 also can include a navigation data server 34 that provides driving, walking, biking, or public transit directions, for example. Further, the communication system 100 can include a map data server 50 that provides map data to the server device 60 for generating a map display. The devices operating in the communication system 100 can be interconnected via a communication network 30.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a churn event identification engine 68, which can identify changes in lane marker geometry.

The churn event identification engine 68 may compare measured lane marker positions within a map patch from the measured map patch data corresponding to a data point to the closest reference lane marker positions in the reference lane marker geometry. For example, the churn event identification engine 68 may calculate the RMSE of the point-wise differences across each of the measured lane marker positions in a map patch. For each data point generated from the measured map patch data, the churn event identification engine 68 may determine the RMSE for measured lane marker positions within the map patch corresponding to the data point compared to the closest reference lane marker positions. The churn event identification engine 68 may also determine the location of the data point (e.g., the map patch center in two-dimensional coordinates), and the time at which the data point was collected.

Then the churn event identification engine 68 compares the RMSEs, locations, and collection times of other data points to the data point to identify data points having RMSEs above a threshold RMSE which are similar in location and time. For example, the data points may be within a threshold distance and threshold collection time of each other. These data points may be identified as corresponding to a churn event.

In other implementations, the churn event identification engine 68 may generate a four-dimensional vector for each data point using the RMSE for the data point, the two-dimensional coordinates for the location of the data point, and the collection time for the data point. Then the churn event identification engine 68 may cluster the data points to identify relationships between the data points. For example, the churn event identification engine 68 may cluster the data points using a Density-Based Spatial Clustering of Applications with Noise (DBSCAN) clustering algorithm, a k-means clustering algorithm, or any other suitable clustering algorithm. The clustering algorithm may identify data points which are geometrically close together according to their Euclidean distance in each dimension, for example. In some implementations, the dimensions may be weighted in the clustering algorithm so that some dimensions are assigned higher importance than others. For example, the RMSE may be assigned higher importance.

In any event, the churn event identification engine 68 may then identify the cluster having the highest RMSE which may be the highest average RMSE, the highest aggregate RMSE, etc. Then the churn event identification engine 68 may determine that this cluster corresponds to a churn event. In other implementations, the churn event identification engine 68 may compare the RMSE of each cluster to a threshold RMSE, and if the RMSE for the cluster exceeds the threshold RMSE, the churn event identification engine 68 may determine that the cluster corresponds to a churn event. In some implementations, the churn event identification engine 68 compares the average RMSE to the threshold RMSE to determine whether the cluster corresponds to a churn event. In other implementations, the churn event identification engine 68 compares the RMSE of each data point in the cluster to the threshold RMSE, and determines that the cluster corresponding to a churn event when the RMSE for each data point in the cluster exceeds the threshold RMSE.

Then when the churn event identification engine 68 identifies a churn event, the churn event identification engine 68 may discard reference lane marker positions from the database 80 corresponding to the data points in the identified cluster. For example, the churn event identification engine 68 may transmit a communication to the map data server 50 and/or the navigation data server 34 with instructions to discard the reference lane marker positions corresponding to the data points in the identified cluster. Then when a client device requests map or navigation data, the discarded reference lane marker geometry is not provided to the client device and lane-by-lane navigation systems do not use the discarded reference lane marker geometry in subsequent navigation requests.

The churn event identification engine 68 and the lane marker detector 14 can operate as components of a churn event detection system. In some implementations, some of the functionality of the lane marker detector 14 can be implemented in the churn event identification engine 68. In other implementations, some of the functionality of the churn event identification engine 68 can be implemented in the lane marker detector 14 (e.g., generating four-dimensional vectors for data points).

For simplicity, FIG. 1 illustrates the server device 60 as only one instance of a server. However, the server device 60 according to some implementations includes a group of one or more server devices, each equipped with one or more processors and capable of operating independently of the other server devices. Server devices operating in such a group can process requests from the vehicles 10a-10n individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

Figure 2A:
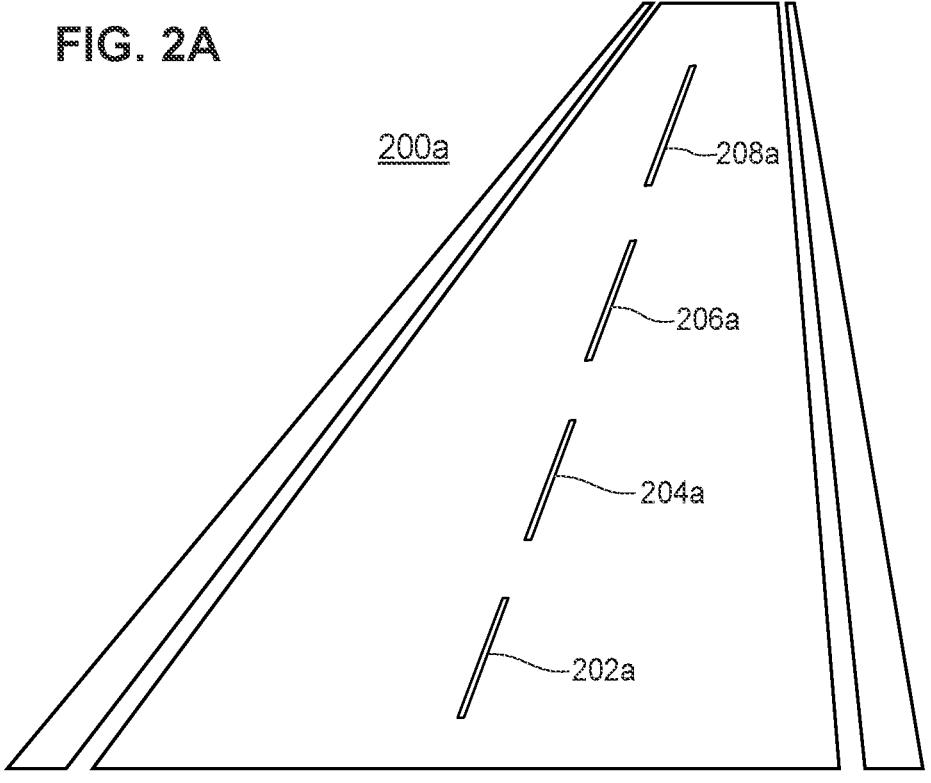
FIGS. 2A-2B illustrate an example road where the lane markers change at a particular point in time, for example due to a lane addition or a lane shift.
Figure 2B:
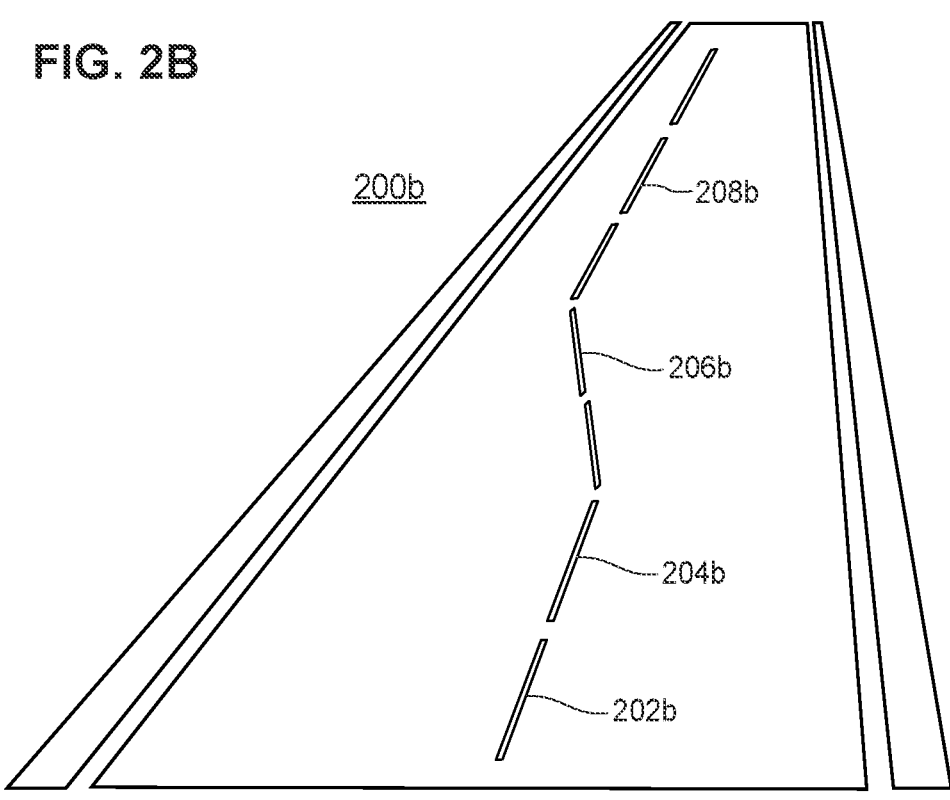

FIGS. 2A and 2B illustrate an example scenario when the locations of lane markers on a road change. As shown in FIG. 2A, the lane markers divide a road 200a into two lanes: a left lane and a right lane. Then in FIG. 2B, the lane markers in the road 200b shift to the left eliminating the left lane and causing cars to merge into one lane. This may be due to a construction event or other traffic incident.

Accordingly, the vehicles 10a-10n at a first point in time may collect images of the road 200a and transmit first map patch data where the lane markers 202a-208a are located in the center of the road 200a. At a second point in time, the vehicles 10a-10n (which may be the same or different vehicles) may collect images of the road 200b and transmit second map patch data where lane markers 202b, 204b are located at the same or similar positions as lane markers 202a, 204a, but lane marker 206b is slightly to the left of lane marker 206a, and lane marker 208b is even further to the left of lane marker 208a. The lane marker positions from the first point in time may be stored in the database 80 as reference lane marker geometry for the geographic area. Then the churn event identification engine 68 may compare the second map patch data from the second point in time to the reference lane marker geometry to determine RMSEs for data points in the second map patch data.

Figure 3:
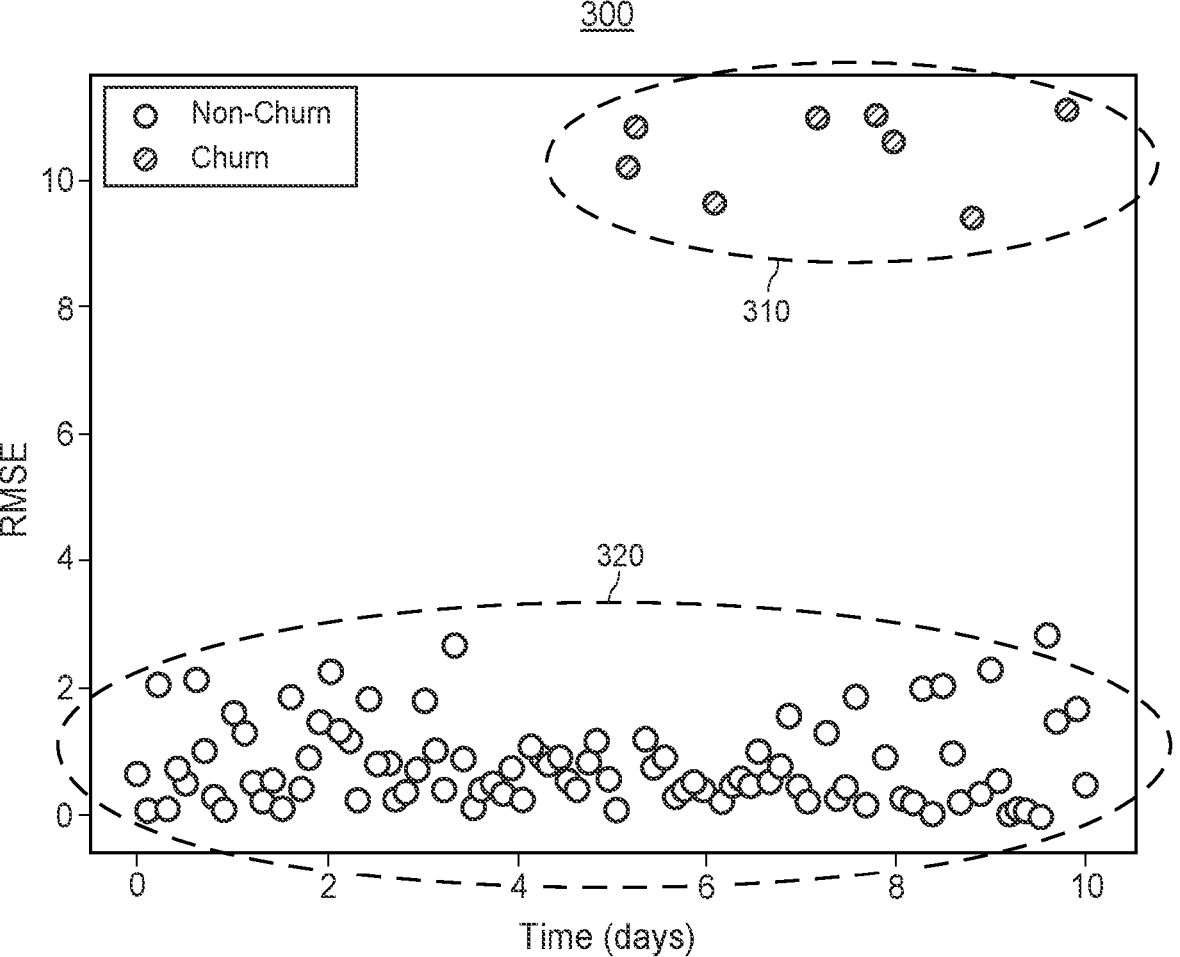
FIG. 3 illustrates an example graph of root mean square errors over time of measured lane marker positions compared to reference lane marker geometry in a particular geographic area.
Figure 4:
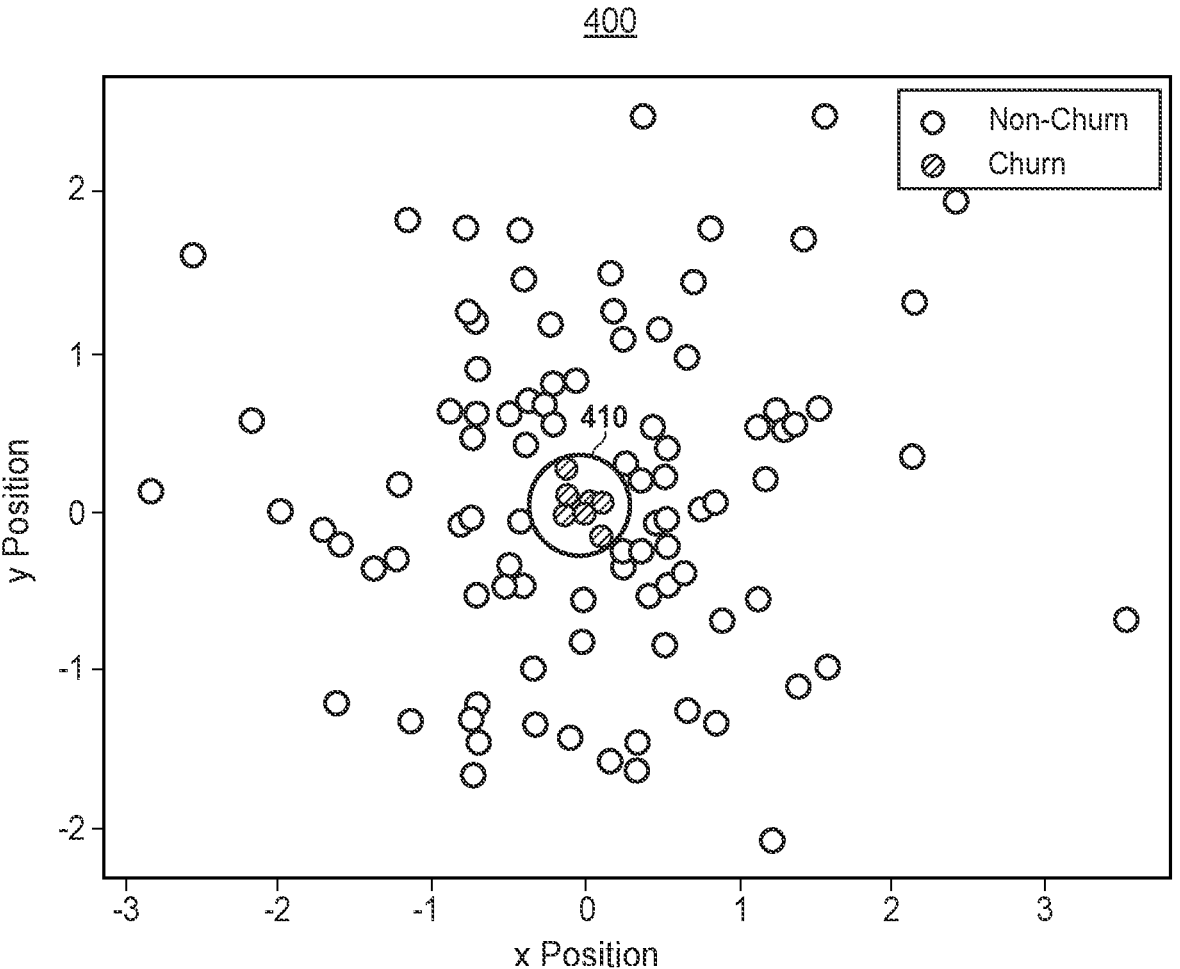
FIG. 4 illustrates an example graph of the locations of lane markers corresponding to churn events compared to lane marker locations that do not correspond to churn events.

FIGS. 3 and 4 illustrate example graphs 300, 400 of lane marker positions corresponding to churn events compared to lane marker positions which do not correspond to churn events. The example graph 300 in FIG. 3 illustrates RMSEs of data points over time in a particular geographic area. As shown in FIG. 3, the data points in cluster 310 with RMSEs above a threshold RMSE (e.g., 8) which were collected after a threshold point in time (e.g., 5 days) correspond to a churn event. The data points in cluster 320 with RMSEs below the threshold RMSE (some of which were collected before the threshold point in time) do not correspond to the churn event.

Turning back to the example illustrated in FIGS. 2A and 2B, the data points in cluster 310 may correspond to the lane markers 206b, 208b collected at the second point time which may have occurred on day five and/or at subsequent points in time on days six through ten. The data points in cluster 320 may correspond to lane markers 202a-208a collected at the first point in time and/or other points in time before day five. The data points in cluster 320 may also correspond to lane markers 202b, 204b collected at the second point in time and/or subsequent points in time on days six through ten, where the lane markers 202b, 204b did not change positions.

The example graph 400 in FIG. 4 illustrates the two-dimensional coordinate locations of the data points in the particular area. As shown in FIG. 4, the data points in cluster 410 are in proximity to each other and correspond to the churn event. The data points outside of cluster 410 do not correspond to the churn event.

Once again turning back to the example illustrated in FIGS. 2A and 2B, the data points in cluster 410 may correspond to the lane markers 206*b*, 208*b* collected at the second point time which are proximate to each other. As mentioned above, the churn event identification engine 68 may cluster the data points in four dimensions using a clustering algorithm such as DBSCAN to identify relationships between the data points. Then the churn event identification engine 68 may identify a cluster as corresponding to a churn event, for example, when the average or minimum RMSE for the cluster is above a threshold RMSE.

Figure 5:
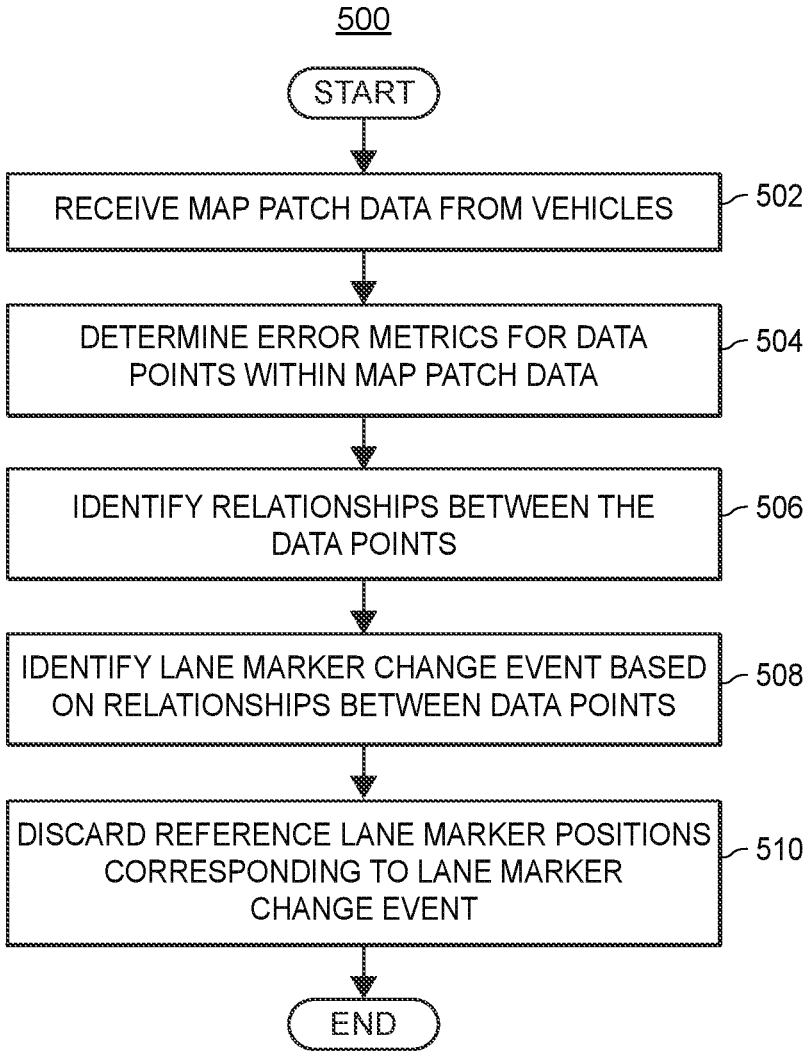
FIG. 5 is a flow diagram of an example method for detecting a change in lane marker geometry, which can be implemented in a computing device that operates in, or cooperates with, a churn event detection system.

FIG. 5 illustrates a flow diagram of an example method 500 for detecting a change in lane marker geometry. The method 500 can be implemented in a set of instructions stored on a computer-readable memory and executable at one or more processors of the server device 60. For example, the method can be implemented by the churn event identification engine 68.

At block 502, the churn event identification engine 68 receives map patch data from vehicles 10*a*-10*n* in a geographic area capturing sensor data indicative of measured lane marker positions on one or more roads. The map patch data may include several data points corresponding to map patches having identified lane markers, the locations of the data points, and the times at which the data points were collected.

Then at block 504, the churn event identification engine 68 determines an error metric for each data point corresponding to a map patch within the map patch data. For example, the churn event identification 68 may obtain a reference lane marker geometry from a database 80 for lane markers that were previously identified using sensor data or in any other suitable matter. The reference lane marker geometry may include reference lane marker positions each indicating a location within a geographic area corresponding to a lane marker or a portion thereof. Then the churn event identification engine 68 determines the error metric for each data point according to the overall RMSE of the differences between the measured lane marker positions within the corresponding map patch from the measured map patch data and the closest reference lane marker positions in the reference lane marker geometry.

At block 506, the churn event identification engine 68 identifies relationships between the data points. For example, the churn event identification engine 68 may identify data points having similar RMSEs and similar locations which were collected at similar points in time. More specifically, the churn event identification engine 68 may cluster the data points according to their RMSEs, locations, and collection times. For example, the churn event identification engine 68 may cluster the data points using a DBSCAN clustering algorithm, a k-means clustering algorithm, or any other suitable clustering algorithm. The clustering algorithm may identify data points which are geometrically close together according to their Euclidean distance in each dimension, for example. In some implementations, the dimensions may be weighted in the clustering algorithm so that some dimensions are assigned higher importance than others. For example, the RMSE may be assigned higher importance.

At block 508, the churn event identification engine 68 may identify a lane marker change event based on the relationships between the data points. For example, the churn event identification engine 68 may identify a cluster having the highest RMSE which may be the highest average RMSE, the highest aggregate RMSE, etc. Then the churn event identification engine 68 may determine that this cluster corresponds to a lane marker change event.

In other implementations, the churn event identification engine 68 may compare the RMSE of each cluster to a threshold RMSE, and if the RMSE for the cluster exceeds the threshold RMSE, the churn event identification engine 68 may determine that the cluster corresponds to a lane marker change event. In some implementations, the churn event identification engine 68 compares the average RMSE to the threshold RMSE to determine whether the cluster corresponds to a churn event. In other implementations, the churn event identification engine 68 compares the RMSE of each data point in the cluster to the threshold RMSE, and determines that the cluster corresponding to a lane marker change event when the RMSE for each data point in the cluster exceeds the threshold RMSE.

Then when the churn event identification engine 68 identifies a lane marker change event, the churn event identification engine 68 may discard reference lane marker positions from the database 80 corresponding to the data points in the identified cluster (block 510). The reference lane marker positions may be within a geographic region corresponding to the locations in the identified cluster. Additionally or alternatively, the reference lane marker positions may be the closest data points in the reference lane marker geometry to data points from the measured map patch data that are included in the cluster. Moreover, the discarded reference lane marker positions include reference lane marker positions which were collected and/or identified prior to the lane marker change event.

For example, the churn event identification engine 68 may transmit a communication to the map data server 50 and/or the navigation data server 34 with instructions to discard the reference lane marker positions corresponding to the data points in the identified cluster. Then when a client device requests map or navigation data, the discarded reference lane marker geometry is not provided to the client device and lane-by-lane navigation systems do not use the discarded reference lane marker geometry in subsequent navigation requests. Instead, the map data server 50 may provide map data which does not include the discarded reference lane marker geometry.

Still further, the churn event identification engine 68 may discard the reference lane marker positions in real-time as the map patch data is collected and the lane marker change event is identified. In this manner, the map data server 50 and/or the navigation data server 34 do not provide outdated map data to client devices which includes inaccurate lane marker geometry.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 500 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The method 500 may be included as part of any backend server (e.g., a map data server, a navigation server, or any other type of server computing device, as described herein), client computing device modules executing within vehicles of the example environment, for example, or as part of a module that is external to such an environment. Though the figures may be described with reference to the other figures for case of explanation, the method 500 can be utilized with other objects and user interfaces. Furthermore, although the explanation above describes steps of the method 500 being performed by specific devices (such as a server device 60), this is done for illustration purposes only. The blocks of the method 500 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for detecting a change in lane marker geometry through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for detecting a change in lane marker geometry, the method comprising:

receiving, at one or more processors, map patch data from a plurality of vehicles within a geographic area indicative of measured lane marker positions;

for each of a plurality of data points within the map patch data, determining, by the one or more processors, an error metric for the data point based on one or more differences between one or more measured lane marker positions for the data point and one or more reference lane marker positions from a database;

identifying, by the one or more processors, relationships between the data points according to the error metric for each data point, a time when each data point was collected, and a location of each data point, wherein the identified relationships are based the data points being within a threshold distance and threshold collection time of each other;

identifying, by the one or more processors, a lane marker change event occurring at a determined time within the geographic area based on the relationships between the data points;

discarding, by the one or more processors, reference lane marker positions from the database collected before the determined time of the lane marker change event; and providing, by the one or more processors, map data which does not include the discarded reference lane marker positions.

2. The method of claim 1, wherein discarding reference lane marker positions includes:

discarding, by the one or more processors, reference lane marker positions collected prior to the lane marker change event.

3. The method of claim 1, wherein discarding reference lane marker positions includes:

discarding, by the one or more processors, reference lane marker positions within a geographic region corresponding to the lane marker change event.

4. The method of claim 3, wherein the geographic region corresponding to the lane marker change event includes each of the locations of the data points corresponding to the lane marker change event.

5. The method of claim 1, wherein identifying relationships between the data points includes:

clustering, by the one or more processors, the data points based on the error metric for each data point, the time when each data point was collected, and the location of each data point.

6. The method of claim 5, wherein identifying the lane marker change event includes:

identifying, by the one or more processors, a cluster having a subset of the data points with error metrics above a threshold error metric; and identifying, by the one or more processors, the lane marker change event for the identified cluster.

7. The method of claim 6, wherein identifying the cluster having the subset of the data points with error metrics above the threshold error metric includes at least one of:

identifying, by the one or more processors, the cluster, wherein an average of the error metrics for the subset of the data points in the cluster is above the threshold error metric; or identifying by the one or more processors, the cluster, wherein each of the error metrics for the subset of the data points in the cluster is above the threshold error metric.

8. The method of claim 1, wherein the error metric is a root mean square error (RMSE).

9. The method of claim 1, wherein the map patch data from the plurality of vehicles is collected over a collection time period of more than one day.

10. The method of claim 1, wherein the reference lane marker positions are discarded in real time as the map patch data is collected and the lane marker change event is identified.

11. A computing device for detecting a change in lane marker geometry, the computing device comprising:

one or more processors; and a non-transitory computer-readable memory coupled to the one or more processors and storing instructions thereon that, when executed by the one or more processors, cause the computing device to:

receive map patch data from a plurality of vehicles within a geographic area indicative of measured lane marker positions;

for each of a plurality of data points within the map patch data, determine an error metric for the data point based on one or more differences between one or more measured lane marker positions for the data point and one or more reference lane marker positions from a database;

identify relationships between the data points according to one or more of: the error metric for each data point, a time when each data point was collected, or a location of each data point, wherein the identified relationships are based the data points being within a threshold distance and threshold collection time of each other;

identify a lane marker change event occurring at a determined time within the geographic area based on the relationships between the data points; and discard reference lane marker positions from the database collected before the determined time of the lane marker change event; and provide map data which does not include the discarded reference lane marker positions.

12. The computing device of claim 11, wherein to discard reference lane marker positions, the instructions further cause the computing device to discard the reference lane marker positions collected prior to the lane marker change event.

13. The computing device of claim 11, wherein to discard reference lane marker positions, the instructions further cause the computing device to discard the reference lane marker positions within a geographic region corresponding to the lane marker change event.

14. The computing device of claim 13, wherein the geographic region corresponding to the lane marker change event includes each of the locations of the data points corresponding to the lane marker change event.

15. The computing device of claim 11, wherein to identify relationships between the data points the instructions cause the computing device to:

cluster the data points based on the error metric for each data point, the time when each data point was collected, and the location of each data point.

16. A non-transitory computer-readable memory storing instructions thereon that, when executed by one or more processors, cause the one or more processors to:

receive map patch data from a plurality of vehicles within a geographic area indicative of measured lane marker positions;

for each of a plurality of data points within the map patch data, determine an error metric for the data point based on one or more differences between one or more measured lane marker positions for the data point and one or more reference lane marker positions from a database;

identify relationships between the data points according to the error metric for each data point, a time when each data point was collected, and a location of each data point, wherein the identified relationships are based the data points being within a threshold distance and threshold collection time of each other;

identify a lane marker change event occurring at a determined time within the geographic area based on the relationships between the data points;

discard reference lane marker positions from the database collected before the determined time of the lane marker change event; and provide map data which does not include the discarded reference lane marker positions.

17. The non-transitory computer-readable memory of claim 16, wherein to discard reference lane marker positions, the instructions further cause the one or more processors to discard the reference lane marker positions collected prior to the lane marker change event.

18. The non-transitory computer-readable memory of claim 16, wherein to discard reference lane marker positions, the instructions further cause the one or more processors to discard the reference lane marker positions within a geographic region corresponding to the lane marker change event.

19. The non-transitory computer-readable memory of claim 18, wherein the geographic region corresponding to the lane marker change event includes each of the locations of the data points corresponding to the lane marker change event.

20. The non-transitory computer-readable memory of claim 16, wherein to identify relationships between the data points, the instructions cause the one or more processors to:

cluster the data points based on the error metric for each data point, the time when each data point was collected, and the location of each data point.

* * * * *